Figure 1:
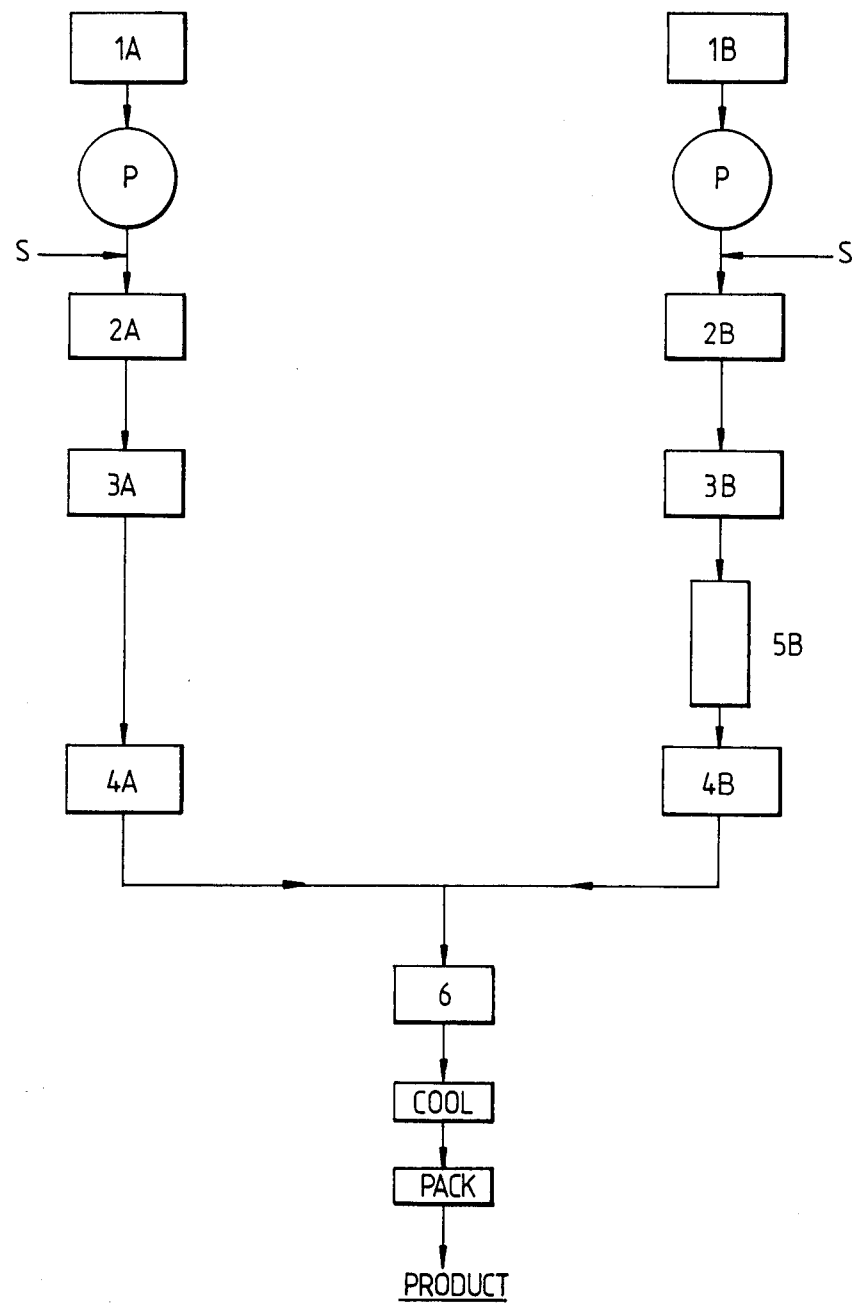

United States Patent [19]

Assinder et al.

[11] Patent Number: 4,640,840
[45] Date of Patent: Feb. 3, 1987

[54] FOOD PROCESSING METHOD TO AVOID NON-ENZYMATIC BROWNING

[75] Inventors: Ivar Assinder, Kempston, England; Michael K. Supran, River Vale, N.J.; Geoffrey A. K. Thompson, Great Barford, England

[73] Assignee: Thomas J. Lipton, Inc., Englewood Cliffs, N.J.

[21] Appl. No.: 731,572

[22] Filed: May 7, 1985

[30] Foreign Application Priority Data

May 8, 1984 [GB] United Kingdom ............... 8411720

[51] Int. Cl.$^4$ .............................................. A23L 1/00
[52] U.S. Cl. .................................... 426/399; 426/401; 426/520; 426/583; 426/658; 426/586; 426/656
[58] Field of Search ............... 426/399, 401, 407, 589, 426/520, 521, 522, 580, 583, 658, 656, 586

[56] References Cited

U.S. PATENT DOCUMENTS

| | | | |
|---|---|---|---|
| 2,426,634 | 9/1947 | Melnick | 426/589 |
| 2,847,310 | 8/1958 | Turnbow | 426/399 |
| 3,770,461 | 11/1973 | Stewart, Jr. et al. | 426/399 |
| 3,970,763 | 7/1976 | Moran et al. | 426/399 |
| 4,144,357 | 3/1979 | Mohammed | 426/589 |
| 4,522,015 | 6/1985 | Hildebolt | 426/399 |

Primary Examiner—Jeanette Hunter
Attorney, Agent, or Firm—Brumbaugh, Graves, Donohue & Raymond

[57] ABSTRACT

Non-enzymatic browning and other quality deteriorating reactions during heat-processing of liquid foodstuffs are minimized by separately aseptically heat-processing the carbohydrate containing components and the nitrogeneous components and finally combining these processed materials at a temperature of at most 65° C.

8 Claims, 1 Drawing Figure

FOOD PROCESSING METHOD TO AVOID NON-ENZYMATIC BROWNING

The present invention relates to a method of minimizing non-enzymatic browning during heat-processing of liquid foodstuffs, particularly soups and most particularly cream-style soups.

One of the reactions which influence most the quality of foods is the so-called non-enzymatic browning or Maillard reaction, which takes place between reducing sugars, aldehydes and/or ketones (hereafter called "the carbohydrate reactant") on the one hand and nitrogenous compounds, in particular proteins and amino acids (hereafter called "the nitrogenous reactant") on the other hand. This reaction is highly temperature dependent and its reaction rate may generally increase from 2 to 3 times for each 10° C. rise in temperature. The Maillard reaction is not only affected by temperature, however, but the activation energy for Maillard reactions decreases with increasing water activity and hence the browning rate increases. Moreover, the browning rate also increases with increasing pH. As a result, the heat processing (like pasteurization and sterilization) of particularly liquid foodstuffs inevitably leads to a deterioration in the organoleptic qualities of these foodstuffs, since in almost all of them the carbohydrate and the nitrogenous reactants for the Maillard reaction are present, although in differing amounts both in quantity and quality. This quality degradation is particularly met in operations for the canning of cream style soups. Discolourations and off-flavours tend to occur, or quality-degrading chemical reactions are started during heat-processing and canning, which further progress during storage.

In extensive experiments, it has now been found that in the processing of liquid foodstuffs, particularly cream-style soups, which are very apt to deteriorate in quality during heat-processing, the occurrence of the non-enzymatic browning or Maillard reaction is minimized by aseptic heat-processing of separate or split streams of those components of the cream-style soup which, upon heating in each other's presence, would have caused the non-enzymatic browning or Maillard reaction (and other degradation reactions) to occur. It will be clear that the separate streams may comprise several components, which are selected in such a way that, upon heat-processing of the mixture of the components in the form of a separate stream, degradation reactions of whatever type will considerably be reduced. The one stream will therefore comprise the carbohydrate reactant and the other stream will comprise the nitrogenous reactant. The carbohydrate and the nitrogenous reactants each, of course, may be more than one substance.

The present invention therefore relates to a method of minimizing non-enzymatic browning and other degradation reactions during heat-processing of liquid foodstuffs, which is characterized in that the components of the liquid foodstuff, comprising the carbohydrate reactant and the components comprising the nitrogenous reactant, are each separately aseptically heat processed and finally combined under conditions such that essentially no quality deterioration of the combined components takes place.

More particularly, the invention relates to a method of minimizing non-enzymatic browning during heat-processing of cream-style soup, which is characterized in that the components comprising the carbohydrate and the components comprising the nitrogenous reactant are separately aseptically heat-processed and finally combined under conditions such that essentially no quality deterioration of the combined components takes place.

Although it is preferably applied to the manufacture of cream-style soups, it will be clear that the method according to the present invention can be applied to all possible types of soups comprising the carbohydrate and the nitrogenous reactants. Since these reactants occur in almost all liquid foodstuffs, the present invention can be used with the same advantages in the manufacture of dressings, sauces, beverages, dairy products, liquid products containing pieces of meat and like foodstuffs.

The separate or split streams to be individually aseptically heat processed each comprise either the carbohydrate reactant or the nitrogenous reactant. In selecting the various components of the foodstuff to be processed in one stream, attention may also be paid to preventing as much as possible other degrading reactions from occurring. In general, the same principle may be applied with regard to the presence of the reactants of such a degradation reaction, i.e. the reactants will each be aseptically heat-processed in each other's absence. For instance, spices may contain traces of metal ions, the presence of which favours lipid oxidation and hence the spices and any fat material present will also be separately aseptically heat-processed. The separate or split stream comprising the carbohydrate reactant, for example, may be combined with any spices, and the stream comprising the nitrogenous reactant may be combined with any lipid or fat ingredient.

It will be clear that more than two separate or split streams may be separately aseptically heat-processed, but for reasons of economy the number of separate or split streams will, of course, be kept as low as possible.

The aseptic heat-processing itself is known per se and any one of the heat-processing techniques or combinations thereof may be used. In general, any processing step involving a heating of the separate or split stream, irrespective of any further treatments taking place, is regarded as a heat-processing step within the scope of the present invention.

The final combination of the separate or split streams which have been separately aseptically heat-processed is effected at a temperature of at most 65° C., preferably at most 50° C.

In the course of experiments, it has been found that the application of the method according to the present invention, in the manufacture of cream-style soups, resulted in soups with excellent colour, improved creaminess and an excellent "clean" flavour. This is completely contrary to the quality of canned, heat-processed cream-style soups, which all invariably exhibit a dark colour and very often have off flavours and a typical, disliked "canned" taste.

The invention will now be elucidated from the flow-sheet depicted in FIG. 1, which embodiment is in no way to be construed as limiting the scope of the invention. In this flow-sheet the ultra-heat-treatment (UHT) process has been depicted for the manufacture of a cream-style soup, comprising a component (A) with the carbohydrate reactant and a component (B) with the nitrogenous reactant.

The component (A) with the carbohydrate reactant was preheated in a premix tank (1A) and subsequently pumped by means of pump (P) to a holding device (2A). Before entering holding device (2A), the component was subjected to a heat treatment with steam (S) by means of direct injection. After this heat treatment the component was kept for some time in the holding device (2A) and then passed to a cooling device (3A), from which it flowed into a buffer tank (4A).

The component (B) with the nitrogenous reactant was preheated in a premix tank (1B) and subsequently pumped by means of pump (P) to a holding device (2B). Before entering holding device (2B), the component was heat-treated with steam (S) by direct injection. The component was held for some time in the holding device (2B) and then passed to a cooling device (3B) and subsequently homogenized in an aseptic homogeniser (5B). Finally, the component (B), which also comprised fat, was passed to a buffer tank (4B).

From buffer tanks (4A) and (4B) the components (A) and (B) were pumped to a mixing vessel (6) in which a third aseptically heat-processed component (C), comprising vegetables, was contained. The three components were now gently mixed at a temperature of about 50° C., upon which the cream-style soup was obtained, which was cooled and packed.

The invention is now illustrated by the following examples, which in no way are to be construed as limiting the scope of the present invention.

EXAMPLE I

A cream-style mushroom soup was prepared as follows: A component (B), comprising the nitrogenous reactant and fat, consisting (in percent by weight):

|   |   |
|---|---|
| 24.5% | demineralized water |
| 60.0% | milk |
| 4.7% | cream |
| 10.8% | butter |
| 100.0% | | was preheated in a premix tank to 50° C. and subsequently heated to 140° C. by direct steam injection and kept at this temperature for 20 to 30 seconds. Subsequently the component was cooled to 40° C. and homogenized in an aseptic homogenizer at 110 bar. After this the component (B) was passed to a buffer tank.

A component (A), comprising the carbohydrate reactant, consisting of (in percent by weight):

|   |   |
|---|---|
| 7.0% | modified starch |
| 0.7% | flavours and spices |
| 92.3% | demineralized water |
| 100.0% | | was preheated in a premix tank to 50° C. and subsequently heated to 140° C. by direct steam injection and kept at this temperature for 20 to 30 seconds. Subsequently the component was cooled to 80° C.

The component (B), having a temperature of 50° C., and the component (A), having a temperature of 80° C., were brought into a mixing vessel in which there were aseptically heat-treated pieces of mushroom in demineralized water in a quantity such that in the final cream-style mushroom soup there was 2.5% by weight (based on the total soup) of mushroom pieces.

Finally the soup was cooled to 25° C. and packed.

COMPARATIVE EXAMPLE

In a comparative example all ingredients (except the pieces of mushroom) of the cream-style mushroom soup as indicated in the example hereinbefore were preheated together in a premix tank to 50° C., after which the mixture was homogenized at a pressure of 80.0 bar. Subsequently the mixture was heated to 140° C. by direct injection of steam and kept at this temperature for 20 to 30 seconds. The treated, homogenized mixture obtained was cooled to 25° C. and packed in the same containers as used in the example given hereinbefore.

The cream-style mushroom soups obtained had the following characteristics:

|   | Viscosity cP | Fat Droplet size μm | Solids % | Overall liking* |
|---|---|---|---|---|
| Example | 142 | 2-6 | 10.4 | 2.84 |
| Comp. example | 194 | 8-20 | 9.5 | 3.05 |

*On a 7-point scale, lower score equals increased liking.

The cream-style mushroom soup as prepared in the example was liked particularly because of its thicker and creamier texture and its pronounced dairy flavour as compared with the soup prepared in the comparative example.

EXAMPLE II

An intermediate for a food product had the following composition:
11% by weight of buttermilk powder
14% by weight of dextrose
75% by weight of water This composition was treated in two ways, viz.:

(I) In a conventional UHT-treatment, this composition was heated for 32 seconds at 140° C. after which the product was cooled down and subsequently samples were taken and stored at 25° C.

(II) In a process according to the present invention, this composition was split into two solutions, viz. one solution (A) with all buttermilk powder and half of the total amount of water and a second solution (B) with all dextrose and the remainder of the water. The solutions (A) and (B) were subsequently each processed separately by subjecting each stream to an UHT-treatment for 32 seconds at 140° C., after which the separate streams were cooled and then combined by mixing at 30° C. Finally samples were taken and stored at 25° C.

After one week storage at the conditions indicated, the product obtained via route (II), as described above, was clearly preferred over the product obtained via route (I) by a group of experienced tasters as having markedly less browning.

EXAMPLE III

A pre-sweetened lemon flavoured tea was prepared, having the following composition:

|   |   |   |
|---|---|---|
| demineralized water | 49017.6 | grams |
| sugar | 4798.0 | grams |
| citric acid | 100.5 | grams |
| green tea | 83.74 | grams |
| lemon flavour | 1.07 | grams |

This tea compositon was processed in two ways, viz.:

(I) The ingredients were combined in the order indicated and mixed for 5 minutes between each ingredient prior to heat processing and subsequently heated for 4 seconds at 127.8° C. (262° F.), after which the product was allowed to cool to room temperature and subsequently filled into 0.5 gallon glass jars, which were kept in a refrigerator.

(II) The total amount of sugar and the total amount of citric acid were dissolved in half the total amount of water to obtain solution (A), and the total amount of green tea and the total amount of lemon flavour were dissolved in the remainder of the total amount of water to obtain solution (B). The solutions (A) and (B) were each separately heat processed for 4 seconds at 128.9° C. (264° F.). After cooling to 25° C. the two solutions were mixed for 5 minutes under as clean conditions as possible, after which the product was filled into 0.5 gallon glass jars, which were kept in a refrigerator.

The samples of the product obtained via routes (I) and (II) were then evaluated by experienced tasters by tasting them in 5 ounce plastic cups which were served from the refrigerator. A statistically significant difference in flavour was found in that the samples of route (II) were consistently be described as sweeter. Also the appearance of the tea obtained via route (II) was noticed as clearer, lighter and more red. The tea obtained via route (I) was more cloudy, darker and more brown.

We claim:

1. A method for minimizing non-enzymatic browning reactions during heat-processing of liquid foodstuffs having carbohydrate and nitrogenous reactants, comprising the steps of:

(a) aseptically heat-processing the carbohydrate components of the liquid foodstuff comprising reducing sugars, aldehydes, ketones, and mixtures thereof;

(b) aseptically heat-processing the nitrogenous components of the liquid foodstuff comprising proteins and amino acids; and (c) combining the aseptically heat-processed components of the liquid foodstuff sub (a) and sub (b) at a temperature of at most 65° C.

2. A method according to claim 1, in which the aseptically heat-processed components of the liquid foodstuff sub (a) and sub (b) are combined at a temperature of at most 50° C.

3. A method according to claim 1, in which the liquid foodstuff contains a lipid material and spices.

4. A method according to claim 3, in which the components of the liquid foodstuff comprising proteins and amino acids are combined with the lipid material prior to the aseptic heat-processing step.

5. A method according to claim 3, in which the components of the liquid foodstuff comprising reducing sugars, aldehydes, ketones is combined with spices prior to the heat-processing step.

6. A method according to any one of claims 1 to 5, in which the liquid foodstuff is a soup.

7. A method according to any one of claims 1 to 5, in which the liquid footstuff is a cream-style soup.

8. A method according to any one of claims 1 to 5, in which the foodstuff is a cream-style soup, and where the aseptically heat-processed componets of the liquid foodstuff sub (a) and sub (b) are combined at a temperature of at most 50° C.

* * * * *

UNITED STATES PATENT AND TRADEMARK OFFICE
CERTIFICATE OF CORRECTION

PATENT NO. : 4,640,840

DATED : 02/03/87

INVENTOR(S) : Assinder et al.

It is certified that error appears in the above-identified patent and that said Letters Patent is hereby corrected as shown below:

Paragraph [30], page 1, please insert the following additional foreign application priority data --August 9, 1984 [NL] The Netherlands . . . . 8,402,457--;

Col. 5, line 25, delete "be";

Col. 6, line 22, after "ketones" insert -- , and mixtures thereof--.

Signed and Sealed this

Twenty-fifth Day of August, 1987

Attest:

DONALD J. QUIGG

Attesting Officer

Commissioner of Patents and Trademarks